(12) United States Patent
Shirai et al.

(10) Patent No.: US 7,304,562 B2
(45) Date of Patent: Dec. 4, 2007

(54) ORGANIC PTC THERMISTOR AND PRODUCTION

(75) Inventors: Satoshi Shirai, Tokyo (JP); Yukie Mori, Tokyo (JP); Tokuhiko Handa, Ichikawa (JP)

(73) Assignee: TDK Corporation, Tokyo (JP)

( * ) Notice: Subject to any disclaimer, the term of this patent is extended or adjusted under 35 U.S.C. 154(b) by 194 days.

(21) Appl. No.: 11/073,844

(22) Filed: Mar. 8, 2005

(65) Prior Publication Data

US 2005/0200446 A1    Sep. 15, 2005

(30) Foreign Application Priority Data

Mar. 9, 2004   (JP)   ............ P2004-066290

(51) Int. Cl.
*H01C 7/10*   (2006.01)
*H01C 7/13*   (2006.01)

(52) U.S. Cl. .................................. 338/22 R

(58) Field of Classification Search ............. 338/22 R, 338/22 SD, 99, 104, 112, 114, 309, 332; 29/623, 830, 846; 252/518.1; 361/126; 501/17, 19
See application file for complete search history.

(56) References Cited

U.S. PATENT DOCUMENTS

| | | | |
|---|---|---|---|
| 3,591,526 A | | 7/1971 | Kawashima et al. |
| 4,966,729 A | | 10/1990 | Carmona et al. |
| 5,122,302 A | * | 6/1992 | Hormadaly .................. 501/17 |
| 5,416,049 A | * | 5/1995 | Mattox ........................ 501/17 |
| 5,880,668 A | * | 3/1999 | Hall .......................... 338/22 R |
| 5,929,744 A | * | 7/1999 | Duggal et al. ............. 338/22 R |
| 6,358,438 B1 | * | 3/2002 | Isozaki et al. ............. 338/22 R |
| 6,522,237 B1 | * | 2/2003 | Ito et al. .................. 338/22 SD |
| 6,778,062 B2 | * | 8/2004 | Handa et al. ............. 338/22 R |
| 6,854,176 B2 | * | 2/2005 | Hetherton et al. ............ 29/623 |
| 2003/0218530 A1 | | 11/2003 | Yoshimari et al. |

FOREIGN PATENT DOCUMENTS

| | | |
|---|---|---|
| CN | 1461016 A | 12/2003 |
| JP | A-04-067508 | 3/1992 |
| JP | A 05-198404 | 8/1993 |
| JP | A-10-125506 | 5/1998 |
| JP | A 11-016706 | 1/1999 |
| JP | A 2000-223303 | 8/2000 |
| TW | 445462 | 7/2001 |
| TW | 513730 | 12/2002 |

* cited by examiner

*Primary Examiner*—Elvin Enad
*Assistant Examiner*—Joselito S. Baisa
(74) *Attorney, Agent, or Firm*—Oliff & Berridge, PLC

(57) ABSTRACT

There is provided a process for producing an organic PTC thermistor including the steps of:
  mixing an organic binder with a filler to obtain a mixture;
  forming on a first conductive foil, a mixture layer including the mixture to obtain a laminate; and
  laminating on the laminate, a second conductive foil or another of the laminate to obtain a sandwich so that the mixture layer can be sandwiched by the opposing conductive foils.

At least one of the mixing step, the layer-forming step and the laminating step is conducted under reduced pressure. An organic PTC thermistor obtained by the production process is also provided.

7 Claims, 1 Drawing Sheet

ORGANIC PTC THERMISTOR AND PRODUCTION

BACKGROUND OF THE INVENTION

1. Field of the Invention

This invention relates to an organic PTC thermistor and a production process therefor

2. Related Background Art

Organic PTC (Positive Temperature Coefficient) thermistors provided with a thermistor body that utilizes an organic material such as thermoplastic resin or thermosetting resin include the known examples of the following dispersions to be used as the thermistor body: the dispersion formed by dispersing metal powders or carbon black in a thermoplastic resin such as polyethylene (e.g., U.S. Pat No. 3,591,526); the dispersion formed by dispersing a fibrous conductive substance such as carbon fiber or metallic fiber (e.g., U.S. Pat. No. 4,966,729); and the dispersion formed by dispersing bubbles in a composition containing a polymer material and a conductive material (e.g., JP-A 4067508 and JP-A 10125506).

SUMMARY OF THE INVENTION

However, when conventional organic PTC thermistors were subjected to high temperature hysteresis, it frequently happened that their resistance characteristics change irreversibly, the ratio of electric resistance value in an operating state to electric resistance value in a non-operating state (the change rate of resistance or the coefficient of resistance variation) markedly decreases and their performance as PTC thermistors deteriorates.

In recent years the so-called lead-free solders, which do not contain lead, have become the mainstream in the filed of electronic devices. When those lead-free solders are used, it is known that the temperatures required at reflow steps are higher than those for conventional lead solders and they sometimes even reach as high as 260° C. For this reason, in the electronic devices with lead-free solders, the problem of durability against the hysteresis that is inherent in the conventional organic PTC thermistors tends to be more apparent.

This invention has been accomplished in view of the circumstances described above, and its object is to provide an organic PTC thermistor with improved durability against high temperature hysteresis during a reflow or similar process to which it is subjected as well as to provide its production process.

The process for producing an organic PTC thermistor according to this invention is characterized in that to solve the aforementioned problem, it is a process for producing an organic PTC thermistor comprising the steps of: mixing an organic binder with a filler to obtain a mixture; layer-forming on a first conductive foil, a mixture layer comprising the mixture to obtain a laminate; and laminating on the laminate, a second conductive foil or another of the laminate to obtain a sandwich so that the mixture layer can be sandwiched by the opposing conductive foils, wherein at least one of the mixing step, the layer-forming step and the laminating step is conducted under reduced pressure.

Up to the present time, it has not been clearly comprehended as to what are the factors responsible for the poor durability of the conventional organic PIC thermistors against the high temperature hysteresis. As a result of the investigations by the present inventors, it was revealed that minute voids contained in a thermistor element body had large influences on the poor durability. Further investigation directed to reducing the amount of these voids has now resulted in the accomplishment of this invention as described above.

As for the mechanism by which the voids reduce the durability, it can possibly be thought that when the thermistor element body contains a large number of voids, these voids form a region in which the density of conductive substances is locally elevated and consequently, the electric resistance value particularly in a high temperature zone has been abnormally lowered (i.e., shorting). Notwithstanding, the mechanism is not to be limited.

In the past, there has been hardly any occasion where such harmful effects of the voids that a thermistor element contains are regarded problematic. Rather, as is disclosed, for example, in JP-A 10125506, the technology was known where voids were actively introduced into the thermistor element body. On the contrary, the present inventors surmise that as in the case where lead-free solders are used, the harmful effects of the voids come into being dominant when the thermistor element body is subjected to hysteresis at higher temperatures.

In the process for producing a PTC thermistor according to this invention, it is preferred that the organic binder be a thermosetting resin and the process further comprise a step of curing the mixture after the laminating step. When a thermosetting resin is employed as the organic binder, the mixture before curing can have a low viscosity and the effects of pressure reduction tend to manifest more prominently than in the case where a thermoplastic resin is employed.

The thermosetting resin is more preferably an epoxy resin containing a curing agent from the standpoint of little contraction during curing as well as from the standpoint of excellent dimensional stability.

The filler to be used in this invention is preferably a conductive filler. If the conductive filler is used, it will be possible to effectively enhance the change rate of resistance of the obtained organic PTC thermistor.

In the production process according to this invention, at least one of the mixing step, the layer-forming step and the laminating step is conducted under reduced pressure. This desirably removes the voids from the mixture layer so that the following equations (1) and (2) can be satisfied:

$$A \geq 100 \qquad \text{Eq. (1)}$$

$$B/A \geq 0.5 \qquad \text{Eq. (2)}$$

wherein A and B each represent the change rate of resistance to be calculated according to the following equation (3) or (4):

$$A = (Ra_1/Ra_0) \times 100 \qquad \text{Eq. (3)}$$

$$B = (Rb_1/Rb_0) \times 100 \qquad \text{Eq. (4)}$$

wherein each of $Ra_0$, $Ra_1$, $Rb_0$ and $Rb_1$ a is an electric resistance value of the organic PTC thermistor; $Ra_0$ represents a value at 25° C. before heating at 260° C.; $Ra_1$ represents a value at 185° C. before heating at 260° C.; $Rb_0$ represents a value at 25° C. after heating at 260° C.; and $Rb_1$ represents a value at 185° C. after heating at 260° C.

If the pressure and other conditions for pressure reduction are appropriately controlled to remove the voids so that the above equations can be satisfied, organic PTC thermistors with improved durability against the hysteresis can be obtained efficiently and reliably.

The organic PTC thermistor of this invention is an organic PTC thermistor comprising a pair of opposing electrodes and an organic substance layer disposed between the pair of electrodes, the organic substance layer containing a resin and a filler dispersed therein, characterized in that voids have been removed from the organic substance layer so that the above equations (1) and (2) can be satisfied. Specifically, the production process of this invention should preferably be employed to yield the organic PTC thermistor.

The filer contained in the organic substance layer is preferably a conductive filler. It is also preferred that the organic substance layer contain the filler in an amount of from 60 to 75 mass % based on the mass of the organic substance layer.

Having the construction described above, the organic PIC thermistor of this invention has been improved in its durability against the high temperate hysteresis during a reflow or similar step to which it is subjected

DESCRIPTION OF THE PREFERRED EMBODIMENTS

Figure 1:
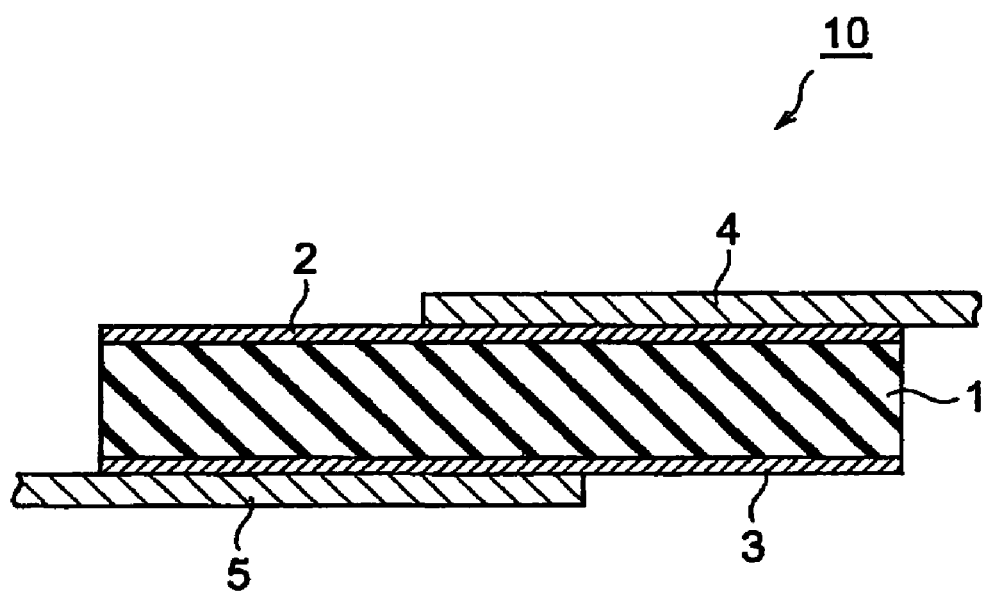
FIG. 1 is a schematic cross-section showing the basic construction of the organic PTC thermistor according one embodiment of this invention.

The preferred embodiments of this invention will be described in detail hereinafter.

(Organic PTC Thermistor)

FIG. 1 is a schematic cross-section showing the basic construction of the organic PTC thermistor according one embodiment of this invention. The organic PTC thermistor 10 shown in FIG. 1 comprises a pair of opposing electrodes 2,3, an organic substance layer 1 (i.e., a thermistor body) disposed between these electrodes, and lead wires 4,5 electrically connected to the corresponding electrodes 2,3.

The organic substance layer 1 contains a resin and a filler dispersed therein and has the so-called "positive resistance-temperature characteristics" such that its electric resistance value (which may be sometimes referred to as "resistance value" hereinafter) increases drastically with rising temperature. Thus, the electrodes 2,3 are used to detect a change in the resistance value of the organic substance layer 1. This can allow the organic PTC thermistor to function as a heating element of the self-controlled type, a temperature sensor, a limiting current element, an overcurrent protecting element or the like. The thickness of the organic substance layer 1 is preferably from 10 to 2,000 μm.

The resin constituting the organic substance layer 1 is principally a cured product of a thermosetting resin, a thermoplastic resin, or the like. In particular, it preferably consists of the cured product of a thermosetting resin. The thermosetting resins include epoxy resins, polyimide resins, unsaturated polyester resins, silicone resins, polyurethane resins, phenol resins, etc. Among these resins, epoxy resins containing their curing agents are preferable.

As the filler to be dispersed in resin, there may preferably be used conductive fillers that are, for example, particles made of conductive materials of the metallic, carbon black, graphite, and ceramic types.

In the case of the utility requiring both of a low resistance value at room temperature and a high change rate of resistance as an example of overcurrent protecting element, it is preferable to use conductive metal particles among the particles delineated above. For preferable conductive metal particles, there are mentioned the particles of at least one metal selected from the group consisting of copper, aluminum, nickel, tungsten, molybdenum, silver, zinc and cobalt In particular, nickel particles are preferably used. The shapes of the filler include those of sphere, flake, rod or the like. In the case of nickel particles, those having spiky protuberances on their surfaces are especially preferred.

It is preferred for the standpoint of performance stability that the filler be uniformly dispersed in the resin. The content of filler in the organic substance 1 is preferably from 60 to 75 mass % based on the mass of the organic substance layer. If the filler content is less that 60 mass %, the resistance value at room temperature tends to be too high. If it exceeds 75 mass %, the dispersability lowers and scattering of the resistance values tends to be large.

The electrodes 2,3 may be formed of a conductive material capable of conducting electricity through the organic substance 1. They are preferably made of a metal foil such as a nickel foil. Their thickness is preferably from 1 to 100 μm.

The organic PTC thermistor 10 retains a suitable change rate of resistance even after having experienced the hysteresis during a reflow or similar step and adequately functions as an organic PTC thermistor, because the voids have been removed from the organic substance layer 1 so that the following equations (1) and (2) can be satisfied:

$$A \geq 100 \qquad \text{Eq. (1)}$$

$$B/A \geq 0.5 \qquad \text{Eq. (2)}$$

wherein A and B each represent the change rate of resistance to be calculated according to the following equation (3) or (4):

$$A = (Ra_1/Ra_0) \times 100 \qquad \text{Eq. (3)}$$

$$B = (Rb_1/Rb_0) \times 100 \qquad \text{Eq. (4)}$$

wherein each of $Ra_0$, $Ra_1$ $Rb_0$ and $Rb_1$ is a resistance value of the organic PTC thermistor, $Ra_0$ represents a value at 25° C. before heating at 260° C.; $Ra_1$ represents a value at 185° C. before heating at 260° C.; $Rb_0$ represents a value at 25° C. after heating at 260° C.; and $Rb_1$ represents a value at 185° C. after heating at 260° C.

The change rate of resistance A for the organic PTC thermistor is the ratio of a resistance value at a temperature (185° C.) supposedly in an operating state of the organic PTC thermistor 10 to a resistance value at a temperature (25° C.) supposedly in a non-operating state. The larger the value is, the higher the temperature detection sensitivity of the organic PTC thermistor is.

Here, the $Ra_0$ and $Ra_1$ values, which are the resistance values used to calculate A, can be obtained by determining through the electrodes 2 and 3, the relationship between resistance values and temperatures (resistance-temperature characteristics) for the organic PTC thermistor 10 before heating at 260° C.

On the other hand, the change rate of resistance B is a value obtained by determining the resistance values for the organic PTC thermistor after heating at 260° C. similarly to the case of A as described above. When the durability against the hysteresis is low, the B value significantly lowers relative to the A value and the ratio B/A of both values will no longer satisfy the equation (2). Here, the time during which heat treatment at 260° C. is carried out to obtain the B value is set within the range of 1 minute ±30 seconds.

In addition, the change rate of resistance A more preferably satisfy the equation (5) described below. Further, B/A more preferably satisfies the equation (6) described below from the standpoint of durability and performance stability. It is even more preferred that the equations (5) and (6) be both satisfied.

$$A \geq 1000 \qquad \text{Eq. (5)}$$

$$B/A \geq 0.8 \qquad \text{Eq. (6)}$$

(Process for Producing Organic PTC Thermistor)

The organic PTC thermistor 10 may preferably be produced by the following process, for example: a process comprising the steps of: mixing an organic binder with a filler to obtain a mixture; layer-forming on a first conductive foil, a mixture layer comprising the mixture to obtain a laminate; and laminating on the laminate, a second conductive foil or another of the laminate to obtain a sandwich so that the mixture layer can be sandwiched by the opposing conductive foils, wherein at least one of the mixing step, the layer-forming step and the laminating step is conducted under reduced pressure. Additionally, with respect to the materials and their shapes for use, there may preferably be used what are similar to those mentioned in connection with the explanation of the organic PTC thermistor 10.

In the mixing step the filler is mixed with the organic binder to yield a mixture in which the filler is dispersed in the organic binder. In order to uniformly disperse the filler, mixing is preferably carried out by kneading the mixture with the aid of a homomixer, homogenizer, beads mill disperser, ball mill disperser, kneader, extruder or the like. When the organic binder is a thermosetting resin, the homogenizer which is excellent in dispersability and workability is the preferable one among those delineated. The kneading time may be normally within the range of from 15 to 60 minutes to attain sufficient dispersion of the filler.

The organic binder is an organic material comprising a thermoplastic resin and/or a thermosetting resin and is preferably a thermosetting resin from the standpoint of dimensional stability, heat resistance and others. Further preferably, this thermosetting resin is what contains an epoxy resin and its curing agent. Then, in kneading after addition of the curing agent it is preferably carried out at a temperature not greater than the reaction temperature of the curing agent.

Low-molecular weight organic compounds such as waxes, oils and fats, fatty acids, and higher alcohols may additionally be combined in the mixture if desired.

In the next layer-forming step, the mixture obtained in the mixing step is applied on the conductive foil (e.g., metal foil) to yield a laminate on which a mixture layer is formed. The application may be carried out by a printing method, a nozzle application method with a flat type nozzle or the like. When the organic binder is a thermosetting resin, the application is preferably done using the printing method.

When the printing method is employed, the application may be done under a reduced pressure atmosphere by vacuum printing, for example, using a commercially available apparatus such as a vacuum printing apparatus (trade name: VPES-HAIII manufactured by Newlong Seimitsu Kogyo Co., Ltd.). More specifically, the mixture is thus poured within a metal flask having a thickness of from 0.1 to 2 mm which is disposed as a spacer on the conductive foil under a reduced pressure atmosphere, and if desired, while heating. The mixture is stretched into a sheet to form the mixture layer on the conductive foil by moving a squeege head with a squeege made of silicone rubber or the like.

Subsequently, in the laminating step a second conductive foil or another laminate is overlaid on the laminate so that the mixture layer can be sandwiched by the opposing conductive foils, thereby yielding a sandwich. When the another laminate is overlaid, lamination is preferably done such that the respective mixture layers belonging to both laminates are made adjacently to each other. Alternatively, one sheet of laminate may be folded to sandwich the mixture layer in between. In the laminating step, it is preferred that the sandwich is pressed while being heated, if desired, so as to pressure join the conductive foils and the mixture layer.

The concrete method for carrying out the laminating step preferably comprises a method by which while the laminates are rolled out from two rolls of the wound laminates, the rolled out laminates are laminated with the mixture layer being sandwiched in such a manner that their respective conductive foils face each other, and are further heated and pressed if desired, because it affords high production efficiency.

In addition, when the organic binder is a thermosetting resin, the resin is punched out into predetermined shapes after undergoing a curing step to cure the mixture, for example, by heating, and lead wires 4 and 5 are connected thereto, providing the organic PTC thermistor 10. Thus, a pair of the conductive foils forms electrodes 2 and 3, and the mixture layer after curing forms the organic substance layer 1.

In the curing step, heating may be carried out at such a temperature and for such a period of time that the thermosetting resin will cure without any practical problems. Normally, heating may be done at a temperature of from 80 to 200° C. for a period of from 60 to 600 minutes in the case of an epoxy resin. When the heating is carried out in the laminating step, the laminating step may also serve as the curing step.

In the process for production described above, at least one of the mixing step, the layer-forming step and the laminating step is conducted under reduced pressure. Among these steps, the layer-forming and/or the laminating step should preferably be conducted under reduced pressure due to the fact that the voids can be efficiently removed from the mixture layer. When a curing step is provided, the curing step in addition to the above steps may be conducted under reduced pressure.

A reduced pressure atmosphere in each step may, for example, be obtained by conducting the step in a hermetic system and decompressing the hermetic system with a vacuum pump or the like. The pressure of the hermetic system is then preferably reduced to 13.3-1333 Pa.

In any step to be conducted under reduced pressure, the pressure reduction should preferably be done under the conditions such that the voids are removed to have the obtained organic PTC thermistor satisfy the equations (1) and (2). Such conditions for pressure reduction may be obtained by optimizing the pressure of the atmosphere, depending on the controlling factors such as the choice of apparatuses or temperatures in the respective steps. Normally, suitable conditions for pressure reduction can be found with relative ease by carrying out not more than several trials while adjusting those controlling factors.

In the mixing step, the mixture may be kneaded under a reduced pressure atmosphere by placing a kneader such as a homogenizer in a hermetic system. Specifically, when the organic binder is a thermosetting resin and is kneaded using a homogenizer, kneading is normally carried out within the ranges of atmosphere's pressure being from 13.3 to 1333 Pa and mixture's temperature being from 20 to 80° C. This allows for an organic PTC thermistor where voids have been removed so that the above equations (1) and (2) can be satisfied.

The layer-forming step may be conducted under reduced pressure by employing the method described above such as vacuum printing. Specifically, when the organic binder is a thermosetting resin and its application is through the vacuum printing, the application is normally carried out within the ranges of atmosphere's pressure being from 13.3 to 1333 Pa and mixture's temperature being from 20 to 80° C. This allows for an organic PTC thermistor where voids have been removed so that the above equations (1) and (2) can be satisfied.

In the laminating step where the organic binder is a thermosetting resin, the conditions are set such that they are within the ranges of atmosphere's pressure being from 13.3 to 1333 Pa and mixture's temperature being from 20 to 80° C. This allows for an organic PTC thermistor where voids have been removed so as to satisfy the above equations (1) and (2).

EXAMPLE

This invention will be described in greater detail by way of the examples; however, the invention is not to be limited thereto.

Example 1

Preparation of Organic PTC Thermistors

Ten weight parts of an epoxy resin (trade name: Rikaresin BPO20E manufactured by New Japan Chemical Co., Ltd), 50 weight parts of a epoxy resin curing agent (trade name: EPICLON B-570 manufactured by Dainippon Ink and Chemicals, Incorporated), and 45 weight parts of a conductive filler (nickel particles manufactured by Nikko Rica Corporation) were mixed, and the mixture was kneaded under normal pressure using a homogenizer to yield a blend.

Next, this blend was applied on a nickel foil (i.e., electrode) under an atmosphere of 133 Pa using a vacuum printing apparatus (trade name: VPES-HAIII manufactured by Newlong Seimitsu Kogyo Co., Ltd.) to form a mixture layer, thereby yielding a laminate.

Subsequently, a pair of the laminates was affixed together with the mixture layer being sandwiched in between under normal pressure in such a manner that they face each other, and the product was pressed to yield a sandwich.

This sandwich was then heated at 150° C. for 10 hours to cure the blend. Thereafter, the product was punched out into plural pieces of predetermined shape using a catpress to prepare organic PTC thermistors.

Measurement of the Change Rate of Resistance

One piece of the obtained organic PTC thermistors was measured for its resistance-temperature characteristics by raising the temperature at a programming rate of 3° C./min. Thus, the resistance value $Ra_0$ at 25° C. was 0.0012 Ω while the resistance value $Ra_1$ at 185° C. was 2.1 Ω. Therefore, the change rate of resistance A before heat treatment was calculated to be $1.75 \times 10^5$, which satisfied the above equation (1).

Further, another piece of the obtained organic PTC thermistors was subjected to heat treatment at 260° C. for 1.5 minutes. When the resistance values of the organic PTC thermistor after heat treatment were measured in the same manner as above, the resistance value $Rb_0$ at 25° C. was 0.0014 Ω while the resistance value $Rb_1$ at 185° C. was 2.43 Ω. Therefore, the change rate of resistance B after heat treatment was calculated to be $1.74 \times 10^5$; and the ratio of the change rates of resistance was then calculated to be 0.99, which satisfied the above equation (2).

Comparative Example 1

Preparation of Organic PTC Thermistors

The blend produced in Example 1 after the mixing step was allowed to stand in a vacuum desiccator under an atmosphere of 133 Pa at 25° C. for 30 minutes.

Subsequently, the blend was applied on a nickel foil under normal pressure to form a mixture layer. The manipulations that followed (i.e., lamination and curing) were done in the same manner as Example 1, yielding organic PTC thermistors.

Measurement of the Change Rate of Resistance

Similarly to Example 1, the obtained organic PTC thermistors were measured for their change rates of resistance before and after heat treatment at 260° C. $Ra_0$ was 0.0012 Ω, $Ra_1$ was 1025 Ω, $Rb_0$ was 0.0014 Ω, and $Rb_1$ was 1.2 Ω. A, B and B/A were, respectively, calculated to be $8.54 \times 10^7$, $1.20 \times 10^5$ and 0.0014. Specifically, although A satisfied the equation (1), the change rate of resistance B after heat treatment lowered significantly and B/A did not fill within the range that satisfied the equation (2).

As explained above, this invention allows for the organic PTC thermistor having, on one hand, a high change rate of resistance and having, on the other hand, improved durability against the high temperature hysteresis during a reflow or similar step to which it is subjected.

What is claimed is:

1. A process for producing an organic PTC thermistor comprising the steps of:

mixing an organic binder with a filler to obtain a mixture;

layer-forming on a first conductive foil, a mixture layer comprising the mixture to obtain a laminate; and laminating on the laminate, a second conductive foil or another of the laminate to obtain a sandwich so that the mixture layer can be sandwiched by the opposing conductive foils, wherein at least one of the mixing step, the layer-forming step and the laminating step is conducted under reduced pressure, wherein the at least one of the mixing step, the layer-forming step and the laminating step is conducted under reduced pressure to remove voids from the mixture layer so that the following equations (1) and (2) can be satisfied:

$$A \geq 100 \qquad \text{Eq. (1)}$$

$$B/A \geq 0.5 \qquad \text{Eq. (2)}$$

wherein A and B each represent the change rate of resistance to be calculated according to the following equation (3) or (4):

$$A = (Ra_1/Ra_0) \times 100 \qquad \text{Eq. (3)}$$

$$B = (Rb_1/Rb_0) \times 100 \qquad \text{Eq. (4)}$$

wherein each of $Ra_0$, $Ra_1$, $Rb_0$ and $Rb_1$ is an electric resistance value of the organic PTC thermistor; $Ra_0$ represents a value at 25° C. before heating at 260° C.; $Ra_1$ represents a value at 185° C. before heating at 260° C.; $Rb_0$ represents a value at 25° C. after heating at 260° C.; and $Rb_1$ represents a value at 185° C. after heating at 260° C.

2. The process for producing an organic PTC thermistor according to claim 1, wherein the organic binder is a thermosetting resin and a step of curing the mixture is further provided after the laminating step.

3. The process for producing an organic PTC thermistor according to claim 2, wherein the thermosetting resin is an epoxy resin containing a curing agent therefor.

4. The process for producing an organic PTC thermistor according to claim 1, wherein the filler is a conductive filler.

5. An organic PTC thermistor comprising:
a pair of opposing electrodes;
an organic substance layer disposed between the pair of electrodes, the organic substance layer containing a resin and a filler dispersed therein, wherein voids have been removed from the organic substance layer so that the following equations (1) and (2) can be satisfied:

$$A \geq 100 \qquad \text{Eq. (1)}$$

$$B/A \geq 0.5 \qquad \text{Eq. (2)}$$

wherein A and B each represent the change rate of resistance to be calculated according to the following equation (3) or (4):

$$A = (Ra_1/Ra_0) \times 100 \qquad \text{Eq. (3)}$$

$$B = (Rb_1/Rb_0) \times 100 \qquad \text{Eq. (4)}$$

wherein each of $Ra_0$, $Ra_1$, $Rb_0$ and $Rb_1$ is an electric resistance value of the organic PTC thermistor; $Ra_0$ represents a value at 25° C. before heating at 260° C.; $Ra_1$ represents a value at 185° C. before heating at 260° C.; $Rb_0$ represents a value at 25° C. after heating at 260° C.; and $Rb_1$ represents a value at 185° C. after heating at 260° C.

6. The organic PTC thermistor according to claim 5, wherein the filler is a conductive filler.

7. The organic PTC thermistor according to claim 5, wherein the content of the filler is from 60 to 75 mass % based on the mass of the organic substance layer.

* * * * *